United States Patent [19]

Sharp et al.

[11] 4,202,411

[45] May 13, 1980

[54] ACID SOLUBLE COATING FOR WELL SCREENS

[75] Inventors: Keith W. Sharp, Sugarland, Tex.; Derry D. Sparlin, Lafayette, La.

[73] Assignee: Baker International Corporation, Orange, Calif.

[21] Appl. No.: 909,318

[22] Filed: May 24, 1978

[51] Int. Cl.$^2$ .................... E21B 43/08; B05D 7/22
[52] U.S. Cl. .................... 166/244 C; 166/227; 166/296; 427/154; 427/230
[58] Field of Search ........ 166/296, 205, 292, 227–236, 166/276, 278.51, 244 C; 427/154, 156, 230, 239, 419 R, 419 A

[56] References Cited

U.S. PATENT DOCUMENTS

| | | | |
|---|---|---|---|
| 2,335,578 | 11/1943 | Carter | 166/205 |
| 2,401,035 | 5/1946 | Akeyson et al. | 166/205 |
| 3,216,497 | 11/1965 | Howard et al. | 166/278 |
| 3,273,641 | 9/1966 | Bourne | 166/276 |
| 3,322,199 | 5/1967 | Van Note, Jr. | 166/276 X |
| 3,333,635 | 8/1967 | Crawford | 166/276 |
| 3,880,233 | 4/1975 | Muecke et al. | 166/296 X |
| 3,905,423 | 9/1975 | Sparlin et al. | 166/296 |

*Primary Examiner*—Stephen J. Novosad
*Attorney, Agent, or Firm*—William C. Norvell, Jr.

[57] ABSTRACT

A well liner for a subterranean well is provided comprising an elongated tubular member which may be a wire wrapped screen having a plurality of slots or passages which are disposed longitudinally and circumferentially of and extending from the outer surface to the inner surface of the tubular member, and an impermeable inorganic matrix substantially filling said slots or passages and coated upon said inner and outer surfaces, said matrix being the reaction product of a first reactant consisting essentially of magnesium oxide and a second reactant consisting essentially of magnesium chloride, in a solvent or solution therefor.

9 Claims, No Drawings

ACID SOLUBLE COATING FOR WELL SCREENS

BACKGROUND OF THE INVENTION

1. Field of the Invention

The invention relates to a screen for producing fluids from subsurface wells and, more particularly, to a well screen having perforations, passages or slots packed with, and the interior and exterior surfaces coated with, an impermeable inorganic matrix. The invention further relates to methods for producing fluids from wells utilizing the screen coated with the impermeable inorganic matrix.

2. Description of the Prior Art

In the completion of wells that produce oil, water, or other fluids, production of fluids from loosely consolidated formations containing sand, silt, or clay presents substantial problems. Such formations contain little or no naturally-occuring binding or cementing materials. As a result, normal fluid flow conditions tend to cause particles from the formations to run into the well bore with attendant deteriorative effects upon fluid production from the well. Clogging of well screens and damage to pumping equipment are examples of problems resulting from sand flow. For the foregoing reasons, proper well completion for production of fluids from loosely consolidated formations requires use of some means to prevent entry of any substantial quantities of formation particles into the well liner. Accordingly, control of sand flow in wells is commonly provided by a sand or gravel pack placed exteriorly of the well liner. One practice is to pack the space between the well liner and the unconsolidated formation with sand or gravel after the liner is set in place. Another practice is to use a pre-filled liner in which sand or gravel is packed within the annular space formed between inner and outer liners.

In the use of sand or gravel packs, control of sand flow is accomplished because the majority of the formation particles are entrapped as they are carried by produced fluids through the interstices of the pack. This occurs as a result of "bridging," by which phenomenon a stable structure of solid particles is built within an opening several times the diameter of the particles that might be expected to flow through the opening.

In many of these procedures of gravel packing a subterranean well, it has been desirable to temporarily close the openings or perforations through the screen in order to prevent contaminant from entering through the perforations within the screen while the liner is being placed within the bore of the well, such that the contaminant, especially particulate contaminant, will stabilize within the perforation itself, thus clogging the screen and rendering it ineffective or less effective for subsequent treatment and production of the well.

Exemplary of prior art compositions for coating screens are those in U.S. Pat. No. 3,216,497, which discloses utilization of an aqueous slurry, paraffin wax, or an oil-soluble hydrocarbon resin. Additionally, this patent discloses, for use in situations where the screen will be contacted with oil, a coating of a water soluble material such as sugar, starch, polyvinyl alcohol, sodium chloride, or other similar compounds which can be crystalized on the screen, then subsequently dissolved with water. This patent also discloses utilization of a coating of a thin sheet of a metallic substance, such as magnesium, which is subsequently dissolved with hydrochloric acid. Polymers such as polyvinyl chloride or polyvinyl acrylate also may be utilized. These organic polymers are subsequently dissolved with tetrachloroethylene.

U.S. Pat. No. 3,273,641 teaches the utilization of plugs of various forms preferably made from a fusible metal or metallic alloy having a melting point which is above the normal reservoir temperature or hydration temperature of cement. These plugs, which are contained within the interior of the perforated or slotted liner, have a melting point which is low enough that a heated fluid, such as steam, hot water, or hot oil can be injected into the interior of the liner or circulated exteriorly thereof to melt the plugs. The fusible alloys used in the composition of the plugs generally are eutectic mixtures of bismuth, tin, lead, cadmium, indium, and antimony in various compositions, combinations and percentages.

U.S. Pat. No. 3,322,199 teaches the use of certain wax materials to reduce permeability and flow to groups of slots filling the well liner with a fluid at a temperature to sufficiently melt the waxy substance in a given group of slots. Preferable, the waxes will either be animal or vegetable waxes because of the property of slight or no solubility in crude oils. For example, animal waxes, such as crude grades of stearic acid, and vegetable waxes, such as carnauba, Japan, and Candelilla waxes may be utilized. Additionally, various synthetic paraffins, such as low molecular weight polyethylenes may be utilized. Gradation of melting points may be achieved by mixtures of the waxes of different melting points or by initial fractionation by means of solvents.

U.S. Pat. No. 3,333,635 discloses the use of a filler material within the bore of the liner which can be easily removed by utilization of a mild solvent. For example, sulphur, heavy grease, and very low melting point metallic alloys which can be removed by hot water may be utilized. Additionally, eutectic mixtures of bismuth, tin, cadmium, indium and antimony may be utilized.

U.S. Pat. No. 3,880,233 teaches the use of certain fatty alcohols, thermal plastic resins and waxes as plugging agents for perforated or slotted liners.

U.S. Pat. No. 3,905,423 discloses plugging and coating materials such as hydrated nitrates of chromium, iron, mercury and nickel. Additionally, this patent discloses plugging agents of pure organic compounds, such as acids, paraffins, gilsonite, beeswax, and certain metals and metallic alloys. Additionally, the patent discloses the utilization of a blend of a wax and a polymer for a plugging agent.

It has been found that these prior art waxes and organic polymer materials may dissolve at too low a temperature when exposed to fluid within the well bore while the screen is being placed immediate perforations in the well. Accordingly, these prior art materials are useful only at the given softening point or melting point of the sealant.

The present invention obviates the problems associated with utilization of prior art compositions by providing a coating composition which may be readily and easily applied completely or partially to the exterior of the screen prior to insertion of the screen into the well bore. The composition is readily available, inexpensive to obtain and prepare, is easily applicable to the exterior of the screen, and has been found to be extremely durable, yet is easily dissolved by utilization of a strong acid or an acid material having a highly disassociatable hydrogen ion. Additionally, utilization of the present composition as a coating for the liner screen provides a screen which is substantially sealed and will prevent penetration therethrough of particulate contaminant when the liner is inserted within the bore of the well and eliminates the need for subsequent utilization of a wash pipe which would be carried within the interior of the screen. The composition protects the screen and the passageways or slots therein from damage and plugging during shipping and handling and while the screen is being run into the well.

SUMMARY OF THE INVENTION

In the present invention, a well liner is provided which comprises an elongated tubular member which has a plurality of slots or passageways disposed longitudinally and circumferentially of and extending from the outer surface to the inner surface of the tubular member. An impermeable inorganic matrix substantially filling said slots or passageways and coated upon inner and outer surface is the reaction product of a first reactant consisting essentially of magnesium oxide and a second reactant consisting essentially of magnesium chloride, in a solvent therefor.

DESCRIPTION OF THE PREFERRED EMBODIMENTS

The present invention provides an inorganic matrix used as a temporary cement filler or coating which is applied to the exterior of a ported, perforated or slotted well liner which, in turn, is subsequently inserted within a well bore for treatment and, thereafter, production, of a producing zone in the well. Preferably, the matrix consists of the reaction product of an equal portion, by weight, of magnesium oxide and magnesium chloride. The inorganic matrix is a reaction product of the above active ingredients, the reaction normally taking place within an aqueous solvent. Numerous ancillary additives may be added to the reaction product, either during or after the initial reaction in the aqueous solvent, for numerous purposes. For example, hydroxyethylcellulose, sodium chloride, polyvinyl alcohol and magnesium carbonate each may be added, as fillers, extenders, etc.

Of course, the magnesium oxide reactant is provided in the form of a solid powder for reaction purposes. The magnesium chloride also may be in the form of a solid, but is preferably utilized in a hydrated state.

It has been found that little difference will be seen in the order of addition of additives, and the particular order of addition is not critical to the invention. After the addition of the desired amounts of magnesium oxide and magnesium chloride, the reaction will take place by the addition of water, thus forming an aqueous slurry or paste.

Although the particular percentages by weight of initial reactants are not particularly critical, it has been found that an equal percentage by weight of magnesium oxide and magnesium chloride will make a very desirable inorganic matrix reactant which is easily applicable upon the exterior of the screen, has strong endurance and hardness characteristics, and is readily removable from the exterior of the screen upon exposure to a solution of strong acid, such as hydrochloric acid. The amount of water added to the reactants to provide an aqueous solution for the reaction may be varied, with amounts as low as about 16% by weight of the total reactants and as high as about 50% by weight of the total reactants, being preferred.

The preferred matrix will contain about 16.3% by weight water, about 39.3% by weight saturated magnesium chloride, and about 44.4% by weight magnesium oxide. A lighter and finer powdered product may be used by increasing the water and magnesium chloride content and by decreasing the magnesium oxide content.

Subsequent to preparation of the slurry or paste, it may be easily applied to the exterior of the screen by utilization of a caulking gun, or the like. Preferably, continuous strips of about one-half inch width of the matrix are squeezed from the caulking gun along the surface of the screen and into the perforated or slotted openings or passageways within the screen by means of a trowel, rubber spatula, or by hand. Depending upon the concentration of active ingredients within the matrix and the amount of water initially added to the reactants, the inorganic matrix can be expected to dry and harden and adhere to the exterior surface of the metallic screen from between about 2 hours and about 4 hours, at room temperature.

After the matrix has been coated onto the screen as described above, sections of the screen may be secured together in conventional fashion and run into the well in a known manner. Thereafter, hydrochloric acid or other strong acid may be circulated in the well in a conventional fashion. This strongly acidic solution will readily dissolve the inorganic matrix to expose the interior of the liner or screen to the well fluids and carrier and treating fluids used in the remedial treating of the production zone of the well, or for similar purposes.

Only a very small amount of acid solution has been found necessary to completely dissolve the inorganic matrix from the exterior of the screen. For example, it has been found that approximately ½ gallon of a 15% active hydrochloric acid solution will dissolve as much as 1 pound of the inorganic matrix consisting of approximately equal amounts by weight of magnesium oxide and magnesium chloride. The amount of acid which is required to dissolve a given amount of matrix of the present invention from a given length and size of screen is easily calculatable for a given length of screen. For example, assuming that a 30 foot length of screen of 2-7/8 inch outside diameter is to be utilized, a satisfactory coating of the screen exterior may be obtained by application of approximately 0.30 pounds of the inorganic matrix per foot of the screen. Accordingly, approximately 9 pounds of the inorganic matrix will be utilized to coat all of the exterior of the screen and, by calculation, approximately 4½ gallons of 15% active hydrochloric acid solution may be utilized to completely dissolve the matrix and discharge the matrix from the perforations in the screen. Since a typical acid treatment of a production zone containing 15 feet of perforations may be expected to use approximately 1,125 gallons of hydrochloric acid, it can be seen that very little amount of that acid will be utilized in dissolving the matrix off of the screen.

Of course, the dissolving rate of the matrix in the acid depends upon the selected acid, the activity of the selected acid, the bottom hole temperature of the well, and whether the acid is flowing by the screen or is ambient in the well bore. For example, it has been found that a 15% active solution of hydrochloric acid will remove a matrix prepared from equal portions by weight of magnesium oxide and magnesium chloride in an aqueous solution on a screen at a temperature of 75° F. in 30 minutes if the acidic solution is flowing around the screen, and in 60 minutes if the screen is exposed only to a bath of the acidic solution. Comparatively, if the same acidic solution of the same inorganic matrix is exposed to a screen at a temperature of 100° F., the matrix will be dissolved from the screen exterior in approximately 15 minutes if the acidic solution is flowing around the screen, and in 30 minutes if the acidic solution is provided in the form of a bath for the screen. If the temperature is raised to 120° F. or higher, the time required for removal of the matrix from the screen if the acidic solution is flowing around the screen is reduced to just 10 minutes, and is reduced to 20 minutes if the acidic solution is provided in the form of a bath for the screen. At 160° F., the matrix is removed from the screen within 3 minutes by a flowing acid, and is removed in just 8 minutes if the screen is in an acid bath.

In an actual well having 15 feet of perforations requiring 30 feet of screen at a bottom hole temperature of about 120° F., it has been found that all of the inorganic matrix will be removed from the screen by a normal acid treatment of the well bore before injection of the gravel pack through the screen interior. Typically, an acid job may consist of 26.8 barrels of 15% active hydrochloric acid solution followed by a second injection of 35.7 barrels of 12% active hydrochloric acid and 3% hydrofluoric acid, followed by a third injection of 13.3 barrels of 15% hydrochloric acid solution per foot of screen. If these solutions are pumped at a rate of 2 barrels per minute, the inorganic matrix will be removed completely from the screen before the first 26.8 barrels of acidic solution has been completely pumped past and below the section of screen.

The inorganic matrix of the present invention is applied to the screen jacket or exterior in the form of a white cream paste that is non-toxic and non-flammable. It will set within approximately 2 hours and will be completely hardened within approximately 4 hours, but may continue to bleed some moisture for several days. However, the bleeding of moisture does not affect the utility of the matrix on the screen. Upon complete hardening of the matrix on the screen, the matrix has been found to have a density of 99.26 pounds per cubic foot and a compressive strength of 6,000 pounds per square inch. The matrix bonds tenaciously to the steel screen wire and has been tested by repeatedly dropping a coated screen on the pavement without any apparent damage to the coating.

The present invention is further illustrated by the following examples, in which, reference to percentages is by weight:

EXAMPLE I

A mixture of 175 ml. of saturated magnesium chloride solution was added to 150 g. of magnesium oxide and heated in a beaker at 115° C. for one hour. The temperature was removed and the resulting matrix was permitted to hard set. Thereafter, the matrix was exposed to a 15% solution of hydrochloric acid and was found to be 100% acid soluble.

EXAMPLE II

A reaction matrix was prepared by adding to 100 g. of water, 15 g. of sodium chloride, 45 g. of magnesium chloride, 45 g. of magnesium oxide, and 3 g. of hydroxyethylcellulose. 115° heat was applied to the reaction for approximately one hour, and the resulting matrix was allowed to set for 24 hours. Thereafter, only slight cracking of the compound was apparent. The compound was exposed to water and its resistance to water was noted, and no adverse affects were noted. The compound appeared to be 100% acid soluble upon exposure to a 15% solution of hydrochloric acid. No visible residue remained after exposure to the acid solution.

EXAMPLE III

A reaction matrix was prepared in a solution of 100 ml. water containing 50 g. of magnesium chloride and 130 g. of magnesium oxide. The reactants in the aqueous solution were stirred to provided a thick paste and applied manually onto the exterior of a wire wrapped screen and permitted to air dry for 24 hours. Upon visual observation thereafter, only slight cracking was noted and the hardened coating to the screen was water resistant and was 100% acid soluble when exposed to a 15% solution of hydrochloric acid.

EXAMPLE IV

An inorganic matrix was prepared in a 50 ml. solution of water by the addition of 1 gram of polyvinyl alcohol, 25 g. of magnesium chloride, and 60 g. of magnesium oxide. Upon aging of the matrix, only slight cracking was noted. The matrix, as applied to the exterior of the screen, had good water resistance and was 100% acid soluble.

EXAMPLE V

An inorganic matrix was prepared in a solution of 50 ml. water by the addition of 55 g. of hydrated magnesium chloride and 95 g. of magnesium oxide. The material was applied to the exterior of a section of wire wrapped screen. Only nominal cracking was observed and good bonding to the screen was achieved. The matrix was 100% acid soluble.

EXAMPLE VI

A matrix was prepared in a 22 ml. aqueous solution by the addition of 53 g. of hydrated magnesium chloride and 60 g. of magnesium oxide to form a smooth paste. The material was applied to the exterior of a screen and no cracking was observed during setting. Excellent bonding characteristics were noted of the matrix onto the screen. The matrix appeared to be completely water resistant, and its compressive strength was tested to be in excess of 1,500 pounds per square inch.

EXAMPLE VII-A

Into a 35% aqueous solution, 15% by weight hydrated magnesium chloride was added, together with 10% by weight of magnesium carbonate and 40% by weight magnesium oxide. A reaction occurred after application of heat. The reactants were found difficult to mix in solution and after application to the screen, numerous cracks were visually observed.

EXAMPLE VII-B

Into a 14.7% aqueous solution was added 35.3% hydrated magnesium chloride (near saturation), 40% magnesium oxide, and 10% magnesium carbonate. The matrix, prepared as above, was applied to a screen section and adhered easily thereto. The setting of the matrix onto the screen was hard and satisfactory, without cracks and with good bonding characteristics.

EXAMPLE VII-C

A 19% aqueous solution was utilized to prepare a matrix containing 46% hydrated magnesium chloride (near saturation) and 35% magnesium oxide. The matrix, prepared as above, appeared to be too thin upon visual observation, and the bonding characteristics to the screen were unsatisfactory.

EXAMPLE VII-D

Into a 17.6% aqueous solution was added 42.4% near saturated magnesium chloride in hydrated form and 40% magnesium oxide. The matrix, prepared as above, mixed easily into a paste, was found to adhere to the screen surface in a satisfactory manner, and upon setup, no cracks were visualized.

EXAMPLE VIII-A

Acid solubility tests were conducted on screen sections coated with the inorganic matrix of the present invention prepared in a 14.7% aqueous solution utilizing 35.3% magnesium chloride (hydrated), 40% magnesium oxide, and 10% magnesium carbonate. This matrix was found to be completely soluble in a 15% solution of hydrochloric acid after approximately 8 minutes in solution. The results of this test are set forth in the table below:

TABLE VIII-A

| Time In Acidic Solution | Weight of Coated Screen |
|---|---|
| 0 | 240.2 g. |
| 4 min. | 235.8 g. |
| 8 min. | 233.4 g. |
| 12 min. | 233.2 g. |
| 16 min. | 233.2 g. |
| 20 min. | 233.2 g. |

EXAMPLE VIII-B

Water resistance tests were conducted upon screen sections coated with the inorganic matrix of the present invention made in a 15% aqueous solution by adding thereto 39.3% magnesium chloride and 44.4% magnesium oxide. The resulting paste was applied to a section of screen and permitted to set. Thereafter, the screen was inserted into a water bath for a given time and weighed. The original coated screen, before exposure to the water bath, weighed 264.5 g. After addition of the screen to the water bath, the bath was heated to 200° F. for 1½ hours. The screen was removed and weighed, at 264.5 g. The screen was permitted to set overnight at room temperature in the bath for a period of 17 hours, and then weighed, at 264.5 g. The screen then was reheated in the bath at 200° F. for 25 hours and weighed, at 263 g.

EXAMPLE IX

A test was conducted to determine the correlation of time and volume of the dissolution of the inorganic matrix in a 15% active solution of hydrochloric acid. Three beakers were utilized, containing 200 ml., 150 ml., and 100 ml. of acid, respectively, at room temperature (74° F.). 10.09 g. of inorganic matrix prepared from an aqueous solution of approximately equal amounts by weight of magnesium chloride and magnesium oxide, the matrix being in the form of a hardened, flattened sheet, was found to be completely dissolved within the acid solution in 20 minutes. To the second beaker was added 10.15 g. of a similar flattened inorganic matrix, which was found to be completely dissolved into the acidic solution in 47 minutes. Into the third beaker was added 10.14 g. of the inorganic matrix which was flattened and thereafter shattered into small pieces, which were found to be completely dissolved into the acidic solution in approximately 55 minutes.

EXAMPLE X-A

A test was conducted in which were dissolved 50 g. of magnesium chloride into 50 ml. of tap water. The magnesium chloride appeared to dissolve readily into the water. Thereafter, the magnesium chloride aqueous solution was poured into 60 g. of magnesium oxide. The reactants appeared to blend without undue difficulty, thus indicating that the variation of the order of addition of initial reactants is not critical to the invention.

EXAMPLE X-B

Fifty grams of magnesium chloride were mixed with 60 g. of magnesium oxide and thereafter 50 ml. of tap water was added to the reactants to provide a pasty material. Although there was minor difficulty in initial mixing, and some magnesium chloride crystals remained undissolved, the end reaction appeared smooth. This test again indicates that the variation of the order of addition of the additives is not critical to the invention.

EXAMPLE X-C

Eighty-three grams of magnesium chloride were dissolved into 50 ml. of tap water. This solution was poured into 60 g. of magnesium oxide reactant and was found to mix readily. The resultant inorganic matrix was an extremely creamy fluid. This example again indicates that the variation in the weight of addition of magnesium chloride and the order of combination of the reactants is not critical to the invention.

EXAMPLE XI

Several tests were conducted to determine the amount of time required to completely dissolve an inorganic matrix in a solution of hydrochloric acid. 10.0 g. of a flattened sheet of a matrix obtained from an aqueous solution of substantially equal proportions of magnesium chloride and magnesium oxide was reacted and permitted to harden. Thereafter, the sheet was placed into a beaker containing 150 ml. of a 15% active solution of hydrochloric acid and stirred. The matrix visually appeared to be completely dissolved in the acidic solution in 7 minutes. A second test was conducted wherein 0.60 g. of the flattened sheet of the matrix was placed in a still beaker containing 350 ml. of 15% active hydrochloric acid and was visually observed to be completely dissolved therein after 41.8 minutes. A third test was conducted utilizing 0.60 g. of a sheet of the matrix, as above, in 350 ml. of 15% hydrochloric acid, but the contents of the beaker were continuously stirred. The matrix was visually observed to be completely dissolved within the hydrochloric acid solution after approximately 3.5 minutes.

EXAMPLE XII

A test was conducted to determine the ability of the inorganic matrix of the present invention to satisfactorily dissolve in a solution of sulfamic acid. A 1⅜ inch O.D., 2 inch length of screen was coated with the matrix material, as described in the above examples, and placed into a beaker containing 350 ml. of water with varying amounts of sulfamic acid. A stirring bar was inserted into the beaker, the stirring bar being activated by magnetic means and responsive to a second magnet contained within a heating element, utilized in the test. The stirring bar provided agitation of the solution to simulate circulation of the solution. At concentrations of 3 pounds per barrel and 7 pounds per barrel of sulfamic acid solution, satisfactory removal of the matrix from the screen was not obtained, even though the solution was heated to a temperature of 152° F., with agitation. However, a similar test utilizing 15 pounds per barrel of sulfamic acid indicated that the screen next to the stir bar was completely free of matrix after 30 minutes and a temperature of 146° F. The interior slots of the screen were cleared of matrix after 35 minutes, and approximately ⅓ of the screen was free of the matrix after 44 minutes and a temperature of 152° F. A third test series was conducted utilizing 30 pounds per barrel of sulfamic acid. The matrix on the exterior of the screen section completely dissolved within the inorganic solution after 4 minutes and a temperature of 122° F. The interior protrusions of the matrix within the interior of the screen appeared visually to be completely dissolved into the acidic solution after 8 minutes and a temperature of 132° F. Moreover, the section of screen immediate the stir bar appeared to be completely free of matrix after 15 minutes and a temperature of 142° F., while the screen was 80% free of the matrix after 22 minutes. Complete cleaning of the screen was accomplished after exposure into this acidic bath for a period of 25 minutes and a temperature of 154° F.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A well liner comprising an elongate tubular member having a plurality of passageways disposed longitudinally and circumferentially of, and extending from the outer surface to the inner surface of, the tubular member, and an impermeable inorganic matrix substantially filling said passageways and coated upon said inner and outer surfaces, said inorganic matrix comprising the reaction product of a first reactant consisting essentially of magnesium oxide and a second reactant consisting essentially of magnesium chloride, in a solvent therefor.

2. A well liner comprising an elongate tubular member having a plurality of passageways disposed longitudinally and circumferentially of, and extending from the outer surface of the inner surface of, the tubular member, and an impermeable inorganic matrix substantially filling said passageways and coated upon said inner and said outer surfaces, said inorganic matrix comprising the reaction product of a first reactant consisting essentially of magnesium oxide and a second reactant consisting essentially of magnesium chloride, in an aqueous solvent therefor.

3. The well liner of claim 1 wherein said first and second reactants are provided in substantially equal amounts by weight.

4. The well liner of claim 2 wherein said first and second reactants are provided in substantially equal amounts by weight.

5. A well liner comprising an elongate tubular member having a plurality of passageways disposed longitudinally and circumferentially of and extending from the outer surface to the inner surface of the tubular member and an impermeable inorganic matrix substantially filling said passageways and coated upon said inner and outer surfaces, said matrix being removable from said inner and outer surfaces and from said passageways upon contact of said well liner with removing amounts of a removing agent selected from the class consisting of hydrochloric acid and sulfamic acid, said inorganic matrix comprising the reaction product of a first reactant consisting essentially of magnesium oxide and a second reactant consisting essentially of magnesium chloride, in a solvent therefor.

6. A method of coating a well liner comprising an elongate tubular member having a plurality of passageways disposed longitudinally and circumferentially of, and extending from the outer surface to the inner surface of the tubular member, said method comprising the steps of: (1) contacting said well liner with a coating amount of an impermeable inorganic matrix substantially filling said passageways and upon said inner and outer surfaces, said inorganic matrix comprising the reaction product of a first reactant consisting essentially of magnesium oxide and a second reactant consisting essentially of magnesium chloride, in a solvent therefor; and (2) drying said well liner by exposure to atmosphere.

7. The method of claim 6 wherein said impermeable inorganic matrix comprises the reaction product of a first reactant consisting essentially of magnesium oxide and a second reactant consisting essentially of magnesium chloride, in an aqueous solvent thereof.

8. The method of claim 6 wherein said impermeable inorganic matrix comprises the reaction product of a first reactant consisting essentially of magnesium oxide and a second reactant consisting essentially of magnesium chloride, in an aqueous solution therefor.

9. A well liner comprising an elongate tubular member having a plurality of passageways disposed longitudinally and circumferentially of, and extending from the outer surface to the inner surface of, the tubular member, and an impermeable inorganic matrix coated upon said inner and outer surfaces, said inorganic matrix comprising the reaction product of a first reactant consisting essentially of magnesium oxide and a second reactant consisting essentially of magnesium chloride, in a solvent therefor.

* * * * *